US006834290B1

(12) United States Patent
Pugh et al.

(10) Patent No.: US 6,834,290 B1
(45) Date of Patent: Dec. 21, 2004

(54) SYSTEM AND METHOD FOR DEVELOPING A COST-EFFECTIVE REORGANIZATION PLAN FOR DATA REORGANIZATION

(75) Inventors: Thomas Pugh, Trabuco Canyon, CA (US); Eyal M. Aronoff, Irvine, CA (US); Ross Doering, Aliso Viejo, CA (US)

(73) Assignee: Quest Software, Inc., Irvine, CA (US)

( * ) Notice: Subject to any disclaimer, the term of this patent is extended or adjusted under 35 U.S.C. 154(b) by 430 days.

(21) Appl. No.: 09/712,890

(22) Filed: Nov. 15, 2000

Related U.S. Application Data

(60) Provisional application No. 60/165,591, filed on Nov. 15, 1999, provisional application No. 60/182,073, filed on Feb. 11, 2000, and provisional application No. 60/241,865, filed on Oct. 20, 2000.

(51) Int. Cl.[7] .............................................. G06F 12/00
(52) U.S. Cl. .......................... 707/205; 707/101; 707/2
(58) Field of Search .............................. 707/100–102, 707/104.1, 200, 202, 204, 205, 1–5, 8–10; 705/1, 5, 7, 8, 10, 28, 29; 706/45

(56) References Cited

U.S. PATENT DOCUMENTS

| | | | |
|---|---|---|---|
| 4,130,867 A | * 12/1978 | Bachman et al. ............... 707/1 |
| 5,222,235 A | * 6/1993 | Hintz et al. .................. 707/101 |
| 5,297,279 A | 3/1994 | Bannon et al. ......... 707/103 R |
| 5,325,505 A | 6/1994 | Hoffecker et al. .......... 707/101 |
| 5,333,314 A | 7/1994 | Masai et al. ................. 707/202 |
| 5,422,979 A | 6/1995 | Eichfeld et al. ................ 706/4 |
| 5,455,945 A | 10/1995 | VanderDrift ................... 707/2 |
| 5,551,020 A | 8/1996 | Flax et al. ................... 707/101 |
| 5,553,303 A | 9/1996 | Hayashi et al. ................ 707/2 |
| 5,596,747 A | 1/1997 | Katabami et al. ........... 707/101 |
| 5,721,915 A | 2/1998 | Sockut et al. ............... 707/200 |
| 5,761,667 A | 6/1998 | Koeppen ..................... 707/101 |
| 5,774,717 A | 6/1998 | Porcaro ....................... 707/202 |

(List continued on next page.)

OTHER PUBLICATIONS

Computer Associates, "Platinum Tsreorg Automates Tablespace Reorganizations, Customer Story," http://platinum.com/products/custstor/tsreorg.htm, 2 pages downloaded and printed from the World Wide Web on Nov. 30, 1999.

Computer Associates, "Rapid Reorg for DB2 for OS/390, Brochure," http://platinum.com/products/brochure/dm/b_rrd.htm, 3 pages downloaded and printed from the World Wide Web on Nov. 30, 1999.

Computer Associates, "Platinum OnlineReorg Technical Overview, Technical Overview," http://platinum.com/products/dba/onreo_to.htm, 5 pages downloaded and printed from the World Wide Web on Nov. 30, 1999.

(List continued on next page.)

*Primary Examiner*—Greta Robinson
*Assistant Examiner*—Harold E. Dodds, Jr.
(74) *Attorney, Agent, or Firm*—Knobbe, Martens, Olson & Bear LLP

(57) ABSTRACT

The invention is a reorganization planning system having a reorganization planner, a database management system, and one or more database files. The reorganization planner communicates with the database management system and the one or more database files to develop a reorganization plan for reorganizing one or more objects of the database files. According to various embodiments, the reorganization planner also provides for in-place object reorganization and application of a benefit threshold. The benefit threshold limits the number of objects recommended for reorganization.

12 Claims, 8 Drawing Sheets

U.S. PATENT DOCUMENTS

| | | | |
|---|---|---|---|
| 5,778,377 A | 7/1998 | Marlin et al. | 707/103 |
| 5,778,392 A | 7/1998 | Stockman et al. | 707/205 |
| 5,799,322 A | 8/1998 | Mosher, Jr. | 707/202 |
| 5,822,780 A | 10/1998 | Schutzman | 711/165 |
| 5,848,416 A | 12/1998 | Tikkanen | 707/101 |
| 5,893,924 A | 4/1999 | Vakkalagadda | 711/165 |
| 5,933,820 A | 8/1999 | Beier et al. | 707/1 |
| 5,940,832 A | 8/1999 | Hamada et al. | 707/100 |
| 5,943,677 A | 8/1999 | Hicks | 707/205 |
| 5,956,504 A | 9/1999 | Jagadish et al. | 707/101 |
| 5,983,239 A | 11/1999 | Cannon | 707/200 |
| 5,991,761 A | 11/1999 | Mahoney et al. | 707/100 |
| 5,995,958 A | 11/1999 | Xu | 707/3 |
| 6,003,022 A * | 12/1999 | Eberhard et al. | 707/2 |
| 6,016,497 A | 1/2000 | Suver | 707/103 |
| 6,026,412 A | 2/2000 | Sockut et al. | 707/200 |
| 6,029,195 A * | 2/2000 | Herz | 725/116 |
| 6,070,170 A | 5/2000 | Friske et al. | 707/202 |
| 6,119,128 A | 9/2000 | Courter et al. | 707/202 |
| 6,122,640 A | 9/2000 | Pereira | 707/103 |
| 6,151,607 A | 11/2000 | Lomet | 707/202 |
| 6,157,932 A | 12/2000 | Klein et al. | 707/204 |
| 6,253,212 B1 | 6/2001 | Loaiza et al. | 707/202 |
| 6,289,357 B1 | 9/2001 | Parker | 707/202 |
| 6,343,296 B1 | 1/2002 | Lakhamraju et al. | 707/103 |
| 6,411,964 B1 | 6/2002 | Iyer et al. | 707/200 |
| 6,460,048 B1 | 10/2002 | Teng et al. | 707/103 R |
| 6,470,344 B1 * | 10/2002 | Kothuri et al. | 707/100 |
| 6,477,535 B1 * | 11/2002 | Mirzadeh | 707/101 |
| 6,519,613 B1 | 2/2003 | Friske et al. | 700/202 |
| 6,584,474 B1 * | 6/2003 | Pereira | 707/200 |
| 2002/0049776 A1 | 4/2002 | Aronoff et al. | 707/200 |

OTHER PUBLICATIONS

Computer Associates, "*ProVision Tsreorg for Oracle, Brochure,*" http://platinum.com/products/brochure/provis/pv__dr.htm, 4 pages downloaded and printed from the World Wide Web on Nov. 30, 1999.

"Space Management and Reorganization: Challenges and Solutions," http://www.quest.com/whitepapers/space_manager_wp.doc, published on or around Dec. 21, 1999.

"*Top Five Tips for Space Management and Reorganization,*" believed to be published after Jul. 21, 1998.

* cited by examiner

TABLESPACE MAP

| TABLE 1 | TABLE 1 | TABLE 1 | FREE SPACE | FREE SPACE |
|---|---|---|---|---|
| INDEX 1 | INDEX 1 | FREE SPACE | FREE SPACE | FREE SPACE |
| TABLE 2 | TABLE 2 | TABLE 2 | TABLE 2 | TABLE 2 |
| TABLE 3 | FREE SPACE | TABLE 3 | FREE SPACE | TABLE 3 |
| FREE SPACE | FREE SPACE | FREE SPACE | INDEX 3 | INDEX 3 |
| TABLE 4 | TABLE 4 | INDEX 4 | FREE SPACE | FREE SPACE |

POTENTIAL TABLESPACE MAP (TABLE T1)

| FREE SPACE | FREE SPACE | FREE SPACE | FREE SPACE | FREE SPACE |
|---|---|---|---|---|
| FREE SPACE | FREE SPACE | FREE SPACE | FREE SPACE | FREE SPACE |
| TABLE 2 | TABLE 2 | TABLE 2 | TABLE 2 | TABLE 2 |
| TABLE 3 | FREE SPACE | TABLE 3 | FREE SPACE | TABLE 3 |
| TABLE 1 | TABLE 1 | TABLE 1 | INDEX 3 | INDEX 3 |
| TABLE 4 | TABLE 4 | INDEX 4 | INDEX 1 | INDEX 1 |

POTENTIAL TABLESPACE MAP (TABLE T3)

| TABLE 1 | TABLE 1 | TABLE 1 | INDEX 3 | INDEX 3 |
|---------|---------|---------|---------|---------|
| INDEX 1 | INDEX 1 | TABLE 1 | TABLE 3 | TABLE 3 |
| TABLE 2 | TABLE 2 | TABLE 3 | TABLE 3 | TABLE 2 |
| FREE SPACE | FREE SPACE | TABLE 2 | FREE SPACE | FREE SPACE |
| FREE SPACE | FREE SPACE | FREE SPACE | FREE SPACE | FREE SPACE |
| TABLE 4 | TABLE 4 | INDEX 4 | FREE SPACE | FREE SPACE |

*FIG. 8*

POTENTIAL TABLESPACE MAP (TABLE T2)

| TABLE 1 | TABLE 1 | TABLE 1 | TABLE 2 | TABLE 2 |
|---------|---------|---------|---------|---------|
| TABLE 2 | TABLE 2 | TABLE 2 | FREE SPACE | FREE SPACE |
| FREE SPACE | FREE SPACE | FREE SPACE | FREE SPACE | FREE SPACE |
| TABLE 3 | FREE SPACE | TABLE 3 | FREE SPACE | TABLE 3 |
| FREE SPACE | TABLE 4 | FREE SPACE | INDEX 3 | INDEX 3 |
| TABLE 4 | INDEX 4 | INDEX 4 | INDEX 1 | INDEX 1 |

*FIG. 7*

POTENTIAL TABLESPACE MAP (INDEX I1)

| TABLE 1 | TABLE 1 | TABLE 1 | FREE SPACE | FREE SPACE |
|---------|---------|---------|------------|------------|
| FREE SPACE | FREE SPACE | FREE SPACE | FREE SPACE | FREE SPACE |
| TABLE 2 | TABLE 2 | TABLE 2 | TABLE 2 | TABLE 2 |
| TABLE 3 | FREE SPACE | TABLE 3 | FREE SPACE | TABLE 3 |
| FREE SPACE | TABLE 4 | FREE SPACE | INDEX 3 | INDEX 3 |
| TABLE 4 | TABLE 4 | INDEX 4 | INDEX 1 | INDEX 1 |

FIG. 10

POTENTIAL TABLESPACE MAP (TABLE T4)

| TABLE 1 | TABLE 1 | TABLE 1 | TABLE 4 | TABLE 4 |
|---------|---------|---------|---------|---------|
| INDEX 1 | INDEX 1 | FREE SPACE | FREE SPACE | FREE SPACE |
| TABLE 2 | TABLE 2 | TABLE 2 | TABLE 2 | TABLE 2 |
| TABLE 3 | INDEX 4 | TABLE 3 | FREE SPACE | TABLE 3 |
| FREE SPACE | FREE SPACE | FREE SPACE | INDEX 3 | INDEX 3 |
| FREE SPACE | FREE SPACE | FREE SPACE | FREE SPACE | FREE SPACE |

POTENTIAL TABLESPACE MAP (INDEX 14) — 1200

| TABLE 1 | TABLE 1 | TABLE 1 | FREE SPACE | FREE SPACE | FREE SPACE |
|---|---|---|---|---|---|
| INDEX 1 | INDEX 1 | FREE SPACE | FREE SPACE | FREE SPACE | FREE SPACE |
| TABLE 2 | TABLE 2 | TABLE 2 | TABLE 2 | TABLE 2 | TABLE 2 |
| TABLE 3 | INDEX 4 | TABLE 3 | FREE SPACE | FREE SPACE | TABLE 3 |
| FREE SPACE | FREE SPACE | FREE SPACE | FREE SPACE | INDEX 3 | INDEX 3 |
| TABLE 4 | TABLE 4 | FREE SPACE | FREE SPACE | FREE SPACE | FREE SPACE |

FIG. 11

POTENTIAL TABLESPACE MAP (INDEX 13) — 1100

| TABLE 1 | TABLE 1 | TABLE 1 | INDEX 3 | INDEX 3 | INDEX 3 |
|---|---|---|---|---|---|
| INDEX 1 | INDEX 1 | FREE SPACE | FREE SPACE | FREE SPACE | FREE SPACE |
| TABLE 2 | TABLE 2 | TABLE 2 | TABLE 2 | TABLE 2 | TABLE 2 |
| FREE SPACE | FREE SPACE | TABLE 3 | FREE SPACE | FREE SPACE | TABLE 3 |
| FREE SPACE | FREE SPACE | FREE SPACE | FREE SPACE | FREE SPACE | FREE SPACE |
| TABLE 4 | TABLE 4 | INDEX 4 | FREE SPACE | FREE SPACE | FREE SPACE |

SYSTEM AND METHOD FOR DEVELOPING A COST-EFFECTIVE REORGANIZATION PLAN FOR DATA REORGANIZATION

REFERENCE TO RELATED APPLICATION

The present application claims priority benefit under 35 U.S.C. § 119(e) from U.S. Provisional Application No. 60/165,591, filed Nov. 15, 1999, entitled "SYSTEM AND METHOD FOR REORGANIZING A DATABASE," U.S. Provisional Application No. 60/182,073, filed Feb. 11, 2000, entitled "SYSTEM AND METHOD FOR REPLICATING DATA," and from U.S. Provisional Application No. 60/241,865, filed Oct. 20, 2000, entitled "SYSTEM AND METHOD FOR DEVELOPING A COST-EFFECTIVE REORGANIZATION PLAN FOR DATA REORGANIZATION," which are incorporated herein by reference.

BACKGROUND OF THE INVENTION

1. Field of the Invention

This invention relates in general to the reorganization of data, and in particular to developing a cost-effective reorganization plan for reorganizing data of a database.

2. Description of the Related Art

A database is generally a collection of information organized such that computer programs can quickly access desired portions of the information. The information is typically referred to as data and the computer program enabling a user to enter, modify, delete, or otherwise organize select data in the database, is often called a database management system (DBMS). Generally, DBMSs govern the internal organization of data. For example, the terms "relational," "network," "flat," "hierarchical," and the like, all refer to ways differing DBMSs organize data. Often, these different internal structures affect how quickly and flexibly data can be extracted from a database. The foregoing notwithstanding, most modern, general-purpose moderate to high-volume databases are designed based on what is known in the art as a Relational Model, and are generally referred to as relational DBMSs. Because the instant invention is relevant to, among other things, a wide number of database platforms, including database management systems (DBMS) and relational DBMSs (RDBMS) systems, these platforms and systems will hereinafter simply be referred to as "DBMS."

With the advent of highly sophisticated DBMSs, such as those offered from Oracle Corporation, IBM, or the like, users are demanding virtually non-interrupted access from virtually anywhere to applications and data. Moreover, users are demanding that accesses occur at peak or near peak performance levels. However, as users or applications, hereinafter referred to as "applications," continually modify the data stored in a particular database, the performance of that database is often adversely affected. For example, as objects of a database grow and shrink in size, the database becomes fragmented, resulting in the database having a large footprint with excessive free space. Moreover, the changing objects may generate chained rows, resulting in a need for multiple disk accesses to acquire desired data. Thus, fragmentation and chaining generally increase data access times and decrease database performance. In order to maintain the accessibility and performance of a particular database, administrators often need to reorganize the data contained therein.

One solution for reorganizing data within a database involves use of storage areas reserved for DBMS use rather than operating system storage. The memory areas are generally referred to as a scratchpad area of memory or scratchpad storage. According to the solution, the data of an original database is completely copied to the scratchpad storage, then copied back to the original location of the original database. The process of copying the data allows the DBMS to remove chained rows and fragmentation from objects and to reduce fragmentation of unallocated storage in the DBMS.

The foregoing reorganization solution suffers from a variety of drawbacks. For example, in order to completely copy each object of the original database to the scratchpad storage, the DBMS needs a scratchpad storage at least as large as the original database. As the size of databases grow, the practicality and likelihood that large enough scratchpad storage will be available decreases. In addition, movement of data within a DBMS is generally very costly in terms of time. Because the foregoing reorganization solution copies data to the scratchpad storage, and then back to the original database, the amount of data that will be moved is twice the size of the original database. Similar to the foregoing, as the size of databases increase, the cost in terms of reorganization time increases at double the rate.

In addition to the foregoing drawbacks, the reorganization solution reorganizes entire databases, irrespective of whether certain objects within the database are even in need of reorganization. For example, while some objects within a database may have experienced dramatic changes in the size of the data stored therein, other objects within the database may not have had data added, modified, or deleted since allocation or the last reorganization. Therefore, some objects of the database may be in great need of reorganization, while others are not.

SUMMARY OF THE INVENTION

Based on the above, a need exists for a faster, less-costly, reorganization solution. In addition, a need exists for a reorganization solution that accounts for the varying need of reorganization among varying objects within a particular database. Accordingly, the present invention includes a reorganization planner that develops a reorganization plan by employing concepts of benefits and costs to the reorganization of objects of a database. According to another embodiment, the reorganization planner, when feasible, performs in-place reorganization of objects. According to one embodiment, in-place reorganization may advantageously reduce the cost of reorganization by at least half.

In addition, according to one embodiment of the invention, the reorganization planner develops the reorganization plan by scheduling the order of reorganization of the objects within a database according to a benefit-cost ratio. Moreover, according to additional aspects of an embodiment of the invention, the reorganization plan includes a benefit threshold, such that objects below the benefit threshold are not recommended for reorganization. The foregoing reorganization planner advantageously allows a system administrator to properly prioritize objects to be reorganized.

According to one embodiment, maintenance operations, such as, for example, reorganizing objects, often make various parts of the database inaccessible to the general user population for a given period of time. That period of time is typically referred to as the batch processing window, and often occurs at night or on the weekends. Thus, by allowing the system administrator to properly prioritize, for example, the reorganization of objects, the reorganization application advantageously achieves much greater benefits during a given batch processing window than could be accomplished through arbitrarily choosing objects to reorganize. The foregoing greater benefit translates into increased database performance (in terms of greater data throughput and faster query response time) to the general user population subsequent to the batch processing window.

Therefore, one aspect of the invention includes a method of developing a plan to reorganize a tablespace that increases the benefit derived from the reorganization while decreasing the cost associated with the reorganization. The method comprises determining an object benefit for each of multiple objects of a tablespace, where each object benefit is associated with the reorganization of one of the multiple objects. The method also includes determining an object cost for each of the multiple objects, where each object cost is associated with the reorganization of one of the multiple objects. The method also includes, for each object, generating a benefit-cost indicator which accounts for object benefit and the object cost associated with the reorganization of the object, and developing a plan for reorganizing the tablespace based on at least the benefit-cost indicator.

Another aspect of the invention includes a method of generating a plan for reorganizing a database. The method comprises determining the benefits and costs of reorganizing one or more objects within a database, and ordering the reorganization of the one or more objects based on the benefits and costs, thereby reorganizing objects having a higher benefit and a correspondingly lower cost before reorganizing objects having a lower benefit and a correspondingly higher cost.

Another aspect of the invention includes a reorganization planning system. The reorganization planning system includes one or more database files storing one or more tablespaces having one or more objects and a system table having information on the one or more objects, and a database management system communicating with the database files, thereby governing the modification of the one or more objects. The reorganization planning system also includes a reorganization planner communicating with the database management system to access system table information associated with the one or more objects, thereby determining benefits and costs of reorganizing at least one of the one or more objects. Wherein the reorganization planner schedules the reorganization of the at least one of the one or more objects based on the benefits and costs.

Another aspect of the invention includes a method of generating a plan for reorganizing data. The method comprises determining a benefit-cost indicator for each of multiple groups of data, where each benefit-cost indicator is associated with reorganizing of at least one of the groups of data stored in a storage medium. The method also includes generating a plan for reorganizing the groups of data based on the benefit-cost indicator, thereby reorganizing at least one group of data having a higher benefit-cost indicator before another group of data.

Another aspect of the invention includes a method of developing a plan to reorganize a tablespace that increases the benefit derived from the reorganization while decreasing the cost associated with the reorganization. The method includes for multiple objects in a tablespace, calculating a benefit and a cost derived from reorganizing each of the multiple objects, where the calculation includes information related to characteristics of the multiple objects. The method also includes calculating an indicator corresponding to each of the multiple objects, where the indicator is greater for objects having a larger benefit per unit cost and is less for objects having a lower benefit per unit cost. The method also includes selecting the object having the best indicator, and developing a plan for reorganization based on the indicator.

Another aspect of the invention includes a software system designed to plan the reorganization of multiple objects stored in a database. The software system accesses the multiple objects through a database management system that tracks multiple characteristics for each of the multiple objects. The software system comprises software commands which access system tables of a database to read values of characteristics of multiple objects of the database, the values providing an indication of data fragmentation in the database. The software system also comprises software commands which calculate benefits and costs associated with the reorganization of the multiple objects from the values. The software system also comprises software commands which iteratively select ones of the multiple objects having a higher benefit-cost ratio than the other objects, and software commands which include the selected ones of the multiple objects into a plan for reorganizing one or more of the multiple objects.

Another aspect of the invention includes a method of planning the reorganization of multiple objects of a tablespace by lowering the amount of data movement associated with the reorganization. The method includes determining a measure of contiguous free space among multiple objects of a tablespace, the multiple objects storing data. The method also includes for at least one object of the multiple objects, determining whether sufficient contiguous free space exists within the tablespace to recreate the object, and when the sufficient contiguous free space exists within the tablespace, developing a plan for reorganizing the object.

Another aspect of the invention includes a method of planning the reorganization of multiple objects of a tablespace by lowering the amount of data movement associated with the reorganization. The method comprises determining a measure of contiguous free space among multiple objects of a tablespace. The method also includes for at least one object of the multiple objects, determining whether sufficient contiguous free space exists within the tablespace to recreate the object. The method also includes when the sufficient contiguous free space does not exist, developing a cost effective plan for moving one or more other objects from the tablespace in order to create sufficient contiguous free space to recreate the object.

Yet another aspect of the invention includes a method of creating contiguous free space within a tablespace for use during the reorganization of an object of the tablespace by temporarily moving one or more other objects out of the tablespace. The method includes determining the benefits and costs of temporarily moving one or more select objects out of a database, and based on the benefits and costs, temporarily storing at least one of the one or more select objects outside the tablespace, thereby creating contiguous free space within the tablespace. The method also includes recreating at least one other object in the contiguous free space.

Another aspect of the invention includes a method developing a plan for reorganizing select objects within a database while excluding from the plan other objects based on the benefits and costs associated with reorganization. The method includes determining an object benefit for each of multiple objects of a database, each object benefit being associated with the reorganization of one of the multiple objects. The method also includes determining an object cost for each of the multiple objects, each object cost being associated with the reorganization of one of the multiple objects, and for each object, generating a benefit-cost indicator which accounts for object benefit and the object cost associated with the reorganization of the object. The method also includes determining a total benefit associated with reorganizing each of the multiple objects of the database, and developing a plan for reorganizing the database. Wherein the plan includes those of the multiple objects whose aggregate object benefits account for a threshold value of the total benefit.

These and other aspects, advantages, and novel features of the invention will become apparent upon reading the following detailed description and upon reference to the accompanying drawings. In the drawings, same elements have the same reference numerals.

BRIEF DESCRIPTION OF THE DRAWINGS

The present invention is described in more detail below in connection with the attached drawings, which are meant to illustrate and not limit the invention, and in which:

FIG. 5 illustrates a simplified diagram of an exemplary tablespace map, according to aspects of yet another embodiment of the invention; and FIGS. 6–12 illustrate simplified diagrams of exemplary potential tablespace maps, according to aspects of yet another embodiment of the invention.

DETAILED DESCRIPTION OF THE PREFERRED EMBODIMENT

The inventions are described in detail below with reference to the figures, wherein like elements are referenced with like numerals throughout.

Figure 1:
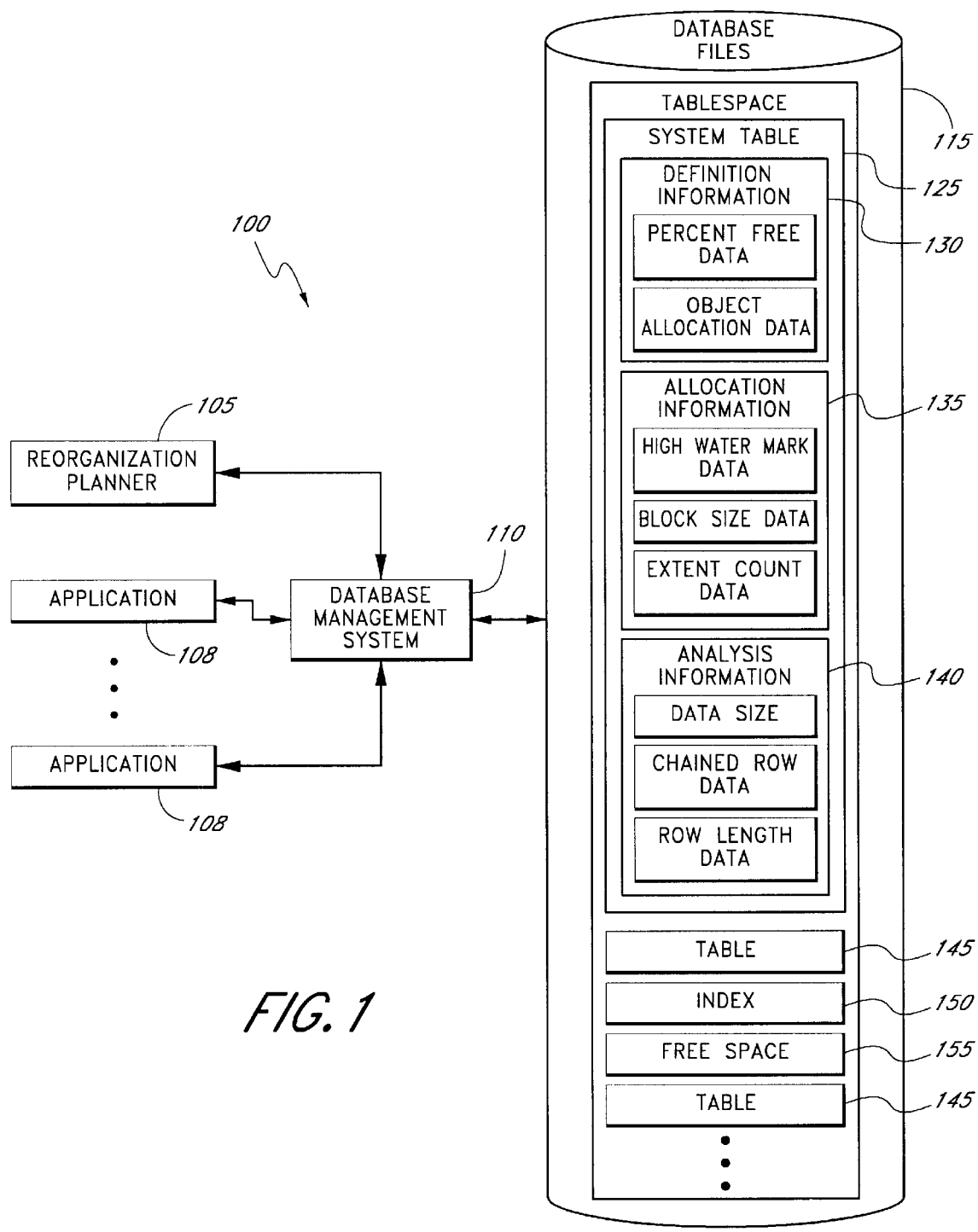
FIG. 1 illustrates a reorganization planning system, according to aspects of an embodiment of the invention.

FIG. 1 illustrates a reorganization planning system 100 according to aspects of an embodiment of the invention. As shown in FIG. 1, the reorganization planning system 100 includes a reorganization planner 105 and one or more applications 108 communicating with a database management system (DBMS) 110 in order to select, modify, or reorganize data stored in one or more objects of one or more databases stored in one or more database files 115. According to one embodiment of the invention, the reorganization planner 105 comprises software designed to develop a reorganization plan for some or all of the data stored in the database files 115. For example, the reorganization planner 105 advantageously develops a reorganization plan governing the order that objects within a database, stored on the database files 115, are to be reorganized. In general, the reorganization plan orders the objects by, for example, applying concepts of benefits and costs to the reorganization of objects of a database. For example, according to one embodiment, the reorganization planner 105 schedules those objects for reorganization which provide the most benefit per unit cost, before those objects that provide lesser benefit, higher corresponding cost, or both. Additionally, according to one embodiment, the reorganization planner 105 advantageously chooses the objects, and their order, such that an increased amount of data can be reorganized through in-place reorganization, as opposed to reorganization through the use of scratchpad storage. The reorganization planner 105 orders the object, based on, among other things, the interdependencies among the objects.

According to an additional embodiment, the reorganization planner 105 also determines a benefit threshold, below which, objects will not be recommended for reorganization. For example, the reorganization planner 105 may advantageously determine a benefit threshold, where reorganization of objects beyond that threshold does not justify the benefit that would be received by the reorganization.

According to one embodiment, the reorganization planner 105 determines the total benefit derived from reorganizing a number of objects, and orders the objects in according to a benefit-cost indicator, such as, for example, a benefit-cost ratio, a benefit value only, a cost value only, or some other combination of a measurement of the benefit and cost of reorganization. The reorganization planner 105 then traverses the order, beginning with the largest benefit-cost ratio, and proceeding toward the smallest. As the reorganization planner 105 makes the traversal, the reorganization planner 105 sums the reorganization benefit for each object traversed, until the reorganization planner 105 reaches the benefit threshold. Objects found after the benefit threshold are not recommended for reorganization.

Although the foregoing benefit threshold is applied during a traversal of objects, the invention is not intended to be limited thereby. Rather, a skilled artisan will recognize from the disclosure herein that the benefit threshold may advantageously be applied on an object-by-object basis, where, when the reorganization of a particular object does not provide a benefit above the benefit threshold, the object is not recommended for reorganization.

Moreover, although the foregoing reorganization planner 105 is disclosed according to various embodiments, the invention is not intended to be limited thereby. Rather, a skilled artisan will recognize from the disclosure herein that the reorganization planner 105 may be included as a part of a broader software application. For example, the reorganization planner 105 may be included in a monitoring software system, such as a performance monitoring or tuning software system designed to provide system administrators tools for managing the database files 115. Also, the reorganization planner 105 may be included in job scheduling software applications designed to offer users utility-type software functionality, reorganization applications, or the like. Alternatively, the reorganization planner 105 may be included in virtually any application designed to interact with the data of the database files 115. Moreover, the reorganization planner 105 may advantageously be incorporated into the DBMS 110, such as, for example, a DBMS utility or the like.

According to another embodiment, the reorganization planner 105 is designed to execute on a computing device, such as a conventional general-purpose computer, computer system, or computer network, having one or more microprocessors, such as, for example, an Intel- or Apple-based processor. Moreover, the general-purpose computer may include an appropriate operating system, such as, for example, an operating system capable of including graphics or windows, such as Windows, Unix, Linux, Mac OS, or the like.

Similar to the reorganization planner 105, the one or more applications 108 may advantageously comprise direct users, one or more software systems, or both, designed to execute on one or more computing devices. According to one embodiment, the one or more applications 108 may advantageously reside on computer systems remote from one another, remote from the reorganization planner 105, or both.

FIG. 1 also shows the reorganization planning system 100 comprising the DBMS 110. According to one embodiment, the DBMS 110 comprises one or more software systems designed to allow the reorganization planner 105 and the one or more applications 108 to select, enter, modify, delete, or otherwise organize or interact with the data stored in the database files 115. Typical DBMSs are commercially available from, for example, Oracle Corporation, IBM, or the like. Similar to the reorganization planner 105, the DBMS 110 is designed to execute on a computing device, such as the foregoing conventional general-purpose computer, computer system, or computer network.

According to one embodiment, the database files 115 comprise devices designed to store large amounts of data, such as, for example, magnetic or optical drives, or drive systems. According to one embodiment, the database files 115 reside locally to the computer system of the DBMS 110. However, a skilled artisan will recognize from the disclosure herein that the database files 115 may advantageously be spread over one or more data storage devices or systems.

According to one embodiment, the reorganization planner 105 may advantageously reside on the same computing platform, system, or network, as that of the one or more applications 108, the DBMS 110, or the database files 115. In addition, the reorganization planner 105, the one or more applications 108, the DBMS 110, and the database files 115 may advantageously pass data back and forth through a wide number of communication techniques know to one of ordinary skill in the art. Such communication techniques may provide for communication over a private communication network, public communication network, or both.

Although the reorganization planning system 100 is disclosed with reference to the foregoing embodiments, the invention is not intended to be limited thereby. Rather, a skilled artisan will recognize from the disclosure herein, a wide number of alternative embodiments of the reorganization planning system 100, including the various components executing on almost any computing device capable of sending or receiving information from another computer system. For example, the reorganization planner 105, the one or more applications 108, the DBMS 110, or the database files 115, may individually or in various combinations, execute on one or more computer workstations, interactive televisions, interactive kiosks, personal mobile computing devices, such as a digital assistant, mobile phone, laptop, or the like, wireless communications devices, smartcards, embedded computing devices, or the like, which can interact with a communication link or network in order to communicate with other components of the reorganization planning system 100. In such alternative systems, the operating systems will likely differ and be adapted for the particular device. However, according to one embodiment, the operating systems advantageously continue to provide the appropriate communications protocols needed to establish communication between the various components of the reorganization planning system 100.

In addition, a skilled artisan will recognize from the disclosure herein that the reorganization planner 105 may advantageously communicate directly with some or all of the database files 115. Also, the reorganization planner 105, the one or more applications 108, the DBMS 110, or the database files 115, may individually or in various combinations, connect to one another through service providers; such as, for example, a dial up, digital subscriber line (DSL), cable modem, fiber connection, or the like, or through network connectivity; such as, for example, one or more public or private local or wide area networks.

FIG. 1 also illustrates the database files 115. As shown in FIG. 1, the DBMS 110 may organize the database files 115 to include logical hierarchical mechanisms for grouping, organizing, and storing data. For example, according to one embodiment where the DBMS 110 comprises an Oracle system, the smallest logical unit comprises a data block. A data block is a defined number of bytes. An extent includes one or more data blocks, and roughly, an object, such as a table or index, includes one or more extents. A tablespace can include zero or more tables and zero or more indexes. An instance, or database, includes one or more tablespaces.

According to one embodiment, for each instance, the DBMS 110 may advantageously include tables having various definitional data, allocation data, and performance data, corresponding to some or all of the foregoing logical mechanisms. For example, as shown in FIG. 1, the database files 115 include a system table 125 having a data definition information 130, allocation information 135, and analysis information 140. According to one embodiment, then data definition information 130 includes object level attributes defined at the time of allocation, such as, for example, percent free (PF) data and object allocation (OA) data. PF data includes how much free space is left in a data block for future growth at the time of initial data insertion, for example, at the creation of a record in the object. OA data includes the average extent size allocated to the objects.

According to another embodiment, the allocation information 135 includes current object level attributes. For example, the allocation information 135 may include high water mark (HWM) data, block size (BS) data, and the extent count (EC) data. HWM data includes the greatest amount of data allocated to the data blocks of an object. BS data includes the number of bytes per data block. BS data is usually system dependent and system administrator configurable. EC data includes the total number of extents for an object.

According to another embodiment, the analysis information 140 includes data computed by the DBMS 110 in response to a request to analyze the current objects. For example, the analysis information 140 may include data size (DS) data, chain row (CR) data, and row length (RL) data. DS data includes the current size of actual data in the object. RL data includes the average length of a row within the object, and the CR data includes the total number of chained rows in an object.

FIG. 1 also shows the database files 115 including multiple tables 145, indexes 150, and free space 155. Although the remaining disclosure refers to the foregoing logical mechanisms for organizing data and their respective definitional, allocation, and performance data, a skilled artisan will recognize from the disclosure herein that analogous logical mechanisms and their respective definitional, allocation, and performance data may advantageously be incorporated into the benefit-cost derivations disclosed below. Moreover, the skilled artisan will recognize from the disclosure herein that the definitional, allocation, and performance data, may advantageously exist for various hierarchical levels of the foregoing analogous logical mechanisms.

Figure 2:
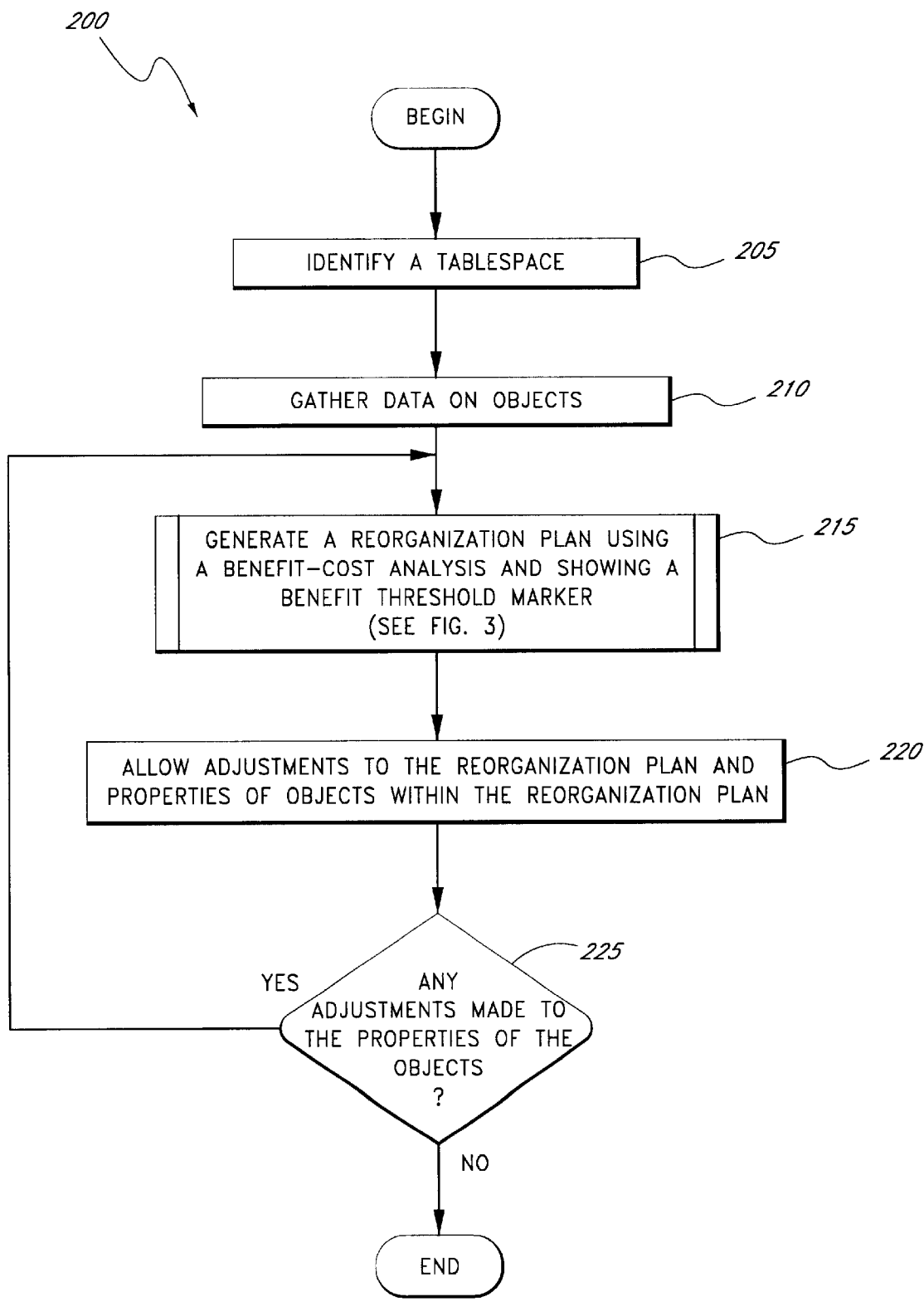
FIG. 2 illustrates a flow chart of a reorganization plan development process, according to aspects of another embodiment of the invention.

FIG. 2 illustrates a flow chart of a reorganization plan development process 200, according to aspects of another embodiment of the invention. As shown in FIG. 2, the development process 200 begins with process BLOCK 205 where a tablespace is identified for reorganization. According to one embodiment, the tablespace was chosen by the system administrator as needing to be reorganized. However, a skilled artisan will recognize from the disclosure herein that the tablespace, or multiple tablespaces, may advantageously be chosen by a wide number of applications. For example, a job scheduling application or utility application may schedule one or more tablespaces for periodic reorganization. Alternatively, a monitoring application may chose the tablespace based on, for example, lowered performance, excessive fragmentation or chained rows, or the like. According to another embodiment, an application may determine that the tablespace should be reorganized, for example, for some or all of the foregoing rationale, and provide it to the system administrator for a final decision regarding reorganization.

Once the tablespace is identified, the development process 200 continues with process BLOCK 210, where the reorganization planner 105 gathers data on objects belonging to the tablespace. For example, the reorganization planner 105 may advantageously access the system table 125 in the database files 115 and select various data pertaining to the objects of the tablespace. Thereafter, the reorganization planner 105, at process BLOCK 215, generates a reorganization plan using a benefit-cost analysis and showing a benefit threshold marker.

As mentioned in the foregoing, the reorganization planner 105 applies a benefit-cost analysis to the objects, such as tables, indexes, and free space, such that those objects whose reorganization produces the greatest benefit for the least cost are reorganized first. According to one embodiment, the reorganization plan schedules the order of object reorganization according to a benefit-cost ratio. In addition to the foregoing, the reorganization plan also places the benefit threshold marker. According to one embodiment, the reorganization planner 105 indicates which objects meet or exceed the benefit threshold marker.

Because the foregoing reorganization plan reorganizes only those objects above the benefit threshold marker, the reorganization planner 105 provides a reorganization plan having a faster, less-costly, reorganization solution. The benefit-cost ratio calculation process, along with the use of the benefit threshold, is described in further detail with respect to FIG. 3.

The development process 200 proceeds to process BLOCK 220, where the reorganization plan, including the benefit threshold marker, is provided to the system administrator. The system administrator may then advantageously modify the reorganization plan, or modify select properties of the objects within the reorganization plan, for a number of reasons. For example, the system administrator may decide to adjust which objects are included in the reorganization plan based on the benefit threshold marker, or the time available during which objects may be made unavailable to the general user population, such as, for example, during the batch processing window. Moreover, the system administrator may adjust the reorganization plan based on the elapsed time since the last reorganization of a particular object, user frequency of the object, availability of the object to the one or more applications 108, underlying hardware speeds of the DBMS 110 or the database files 115, or the like.

According to yet another embodiment, the system administrator may, after placing the benefit threshold marker, enter new values for various properties of one, some, or all of the objects to be reorganized. Although the foregoing provides the reorganization plan to the system administrator, a skilled artisan will recognize from the disclosure herein that the reorganization planner 105 may automatically use the benefit threshold to truncate objects from the reorganization plan. Moreover, the reorganization planner 105 may advantageously adjust the benefit threshold value based on historical data, for example, benefit and cost data from specific hardware-software system combinations or the like.

According to one embodiment, the development process 200 proceeds to process BLOCK 225, where the reorganization planner 105 determines whether, during process BLOCK 220, any adjustments were made to the properties of the objects within that plan. When no adjustments to the properties of the objects have been made, the development process 220 ends. On the other hand, when adjustments were made, the development process 225 returns to process BLOCK 215, and redevelops the reorganization plan. According to one embodiment, the foregoing redirection back to process BLOCK 215 occurs once. According to other embodiments, the redirection may occur until the system administrator is satisfied with the reorganization plan.

Based on the foregoing, the reorganization planner 105 advantageously uses the development process 200 to develop the reorganization plan having the benefit threshold marker. The system administrator or another application may then advantageously modify the benefit threshold marker, which objects are to be scheduled for reorganization, or the like, according to specific user information or user needs, such as particular system hardware/software combinations, data availability issues, or the like.

Figure 3:
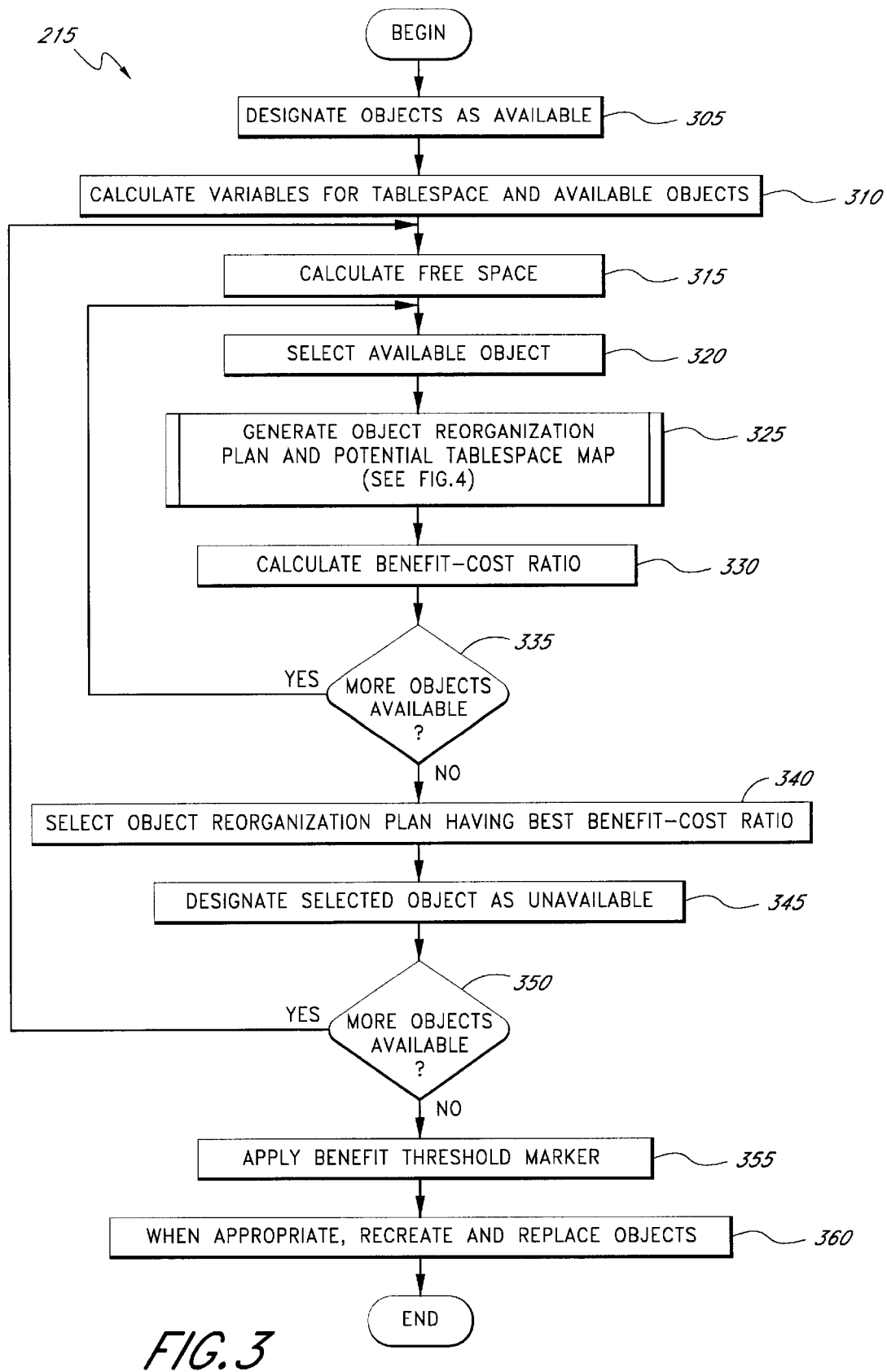
FIG. 3 illustrates a flow chart of a benefit-cost calculation process, according to aspects of another embodiment of the invention.

FIG. 3 illustrates a flow chart of a benefit-cost calculation process 215, according to aspects of another embodiment of the invention. As mentioned in the foregoing, the calculation process 215 applies a benefit-cost analysis to the objects of a tablespace. According to one embodiment, the "benefits" received from reorganization of a particular object, refer to a reduction in the reorganization need (N) of a particular object and an improvement in the free space distribution within the tablespace. The reorganization need of an object is reduced by, for example, recreating that object, and repopulating it with its data. The process of recreating and repopulating an object will generally eliminate wasted blocks in the object, reduce the number of chained rows, and reduce the number of extents allocated. The free space distribution in a tablespace is improved by, for example, causing free space to be organized into fewer, larger extents as opposed to many, smaller extents.

According to another embodiment, the "costs" associated with reorganization of a particular object, refer to the number of data blocks of data that are to be moved. As mentioned in the foregoing, movement of data takes the bulk of time and resources in the database.

As shown in FIG. 3, the calculation process 215 begins with process BLOCK 305, where the reorganization planner 105 designates the objects of a tablespace as available for reorganization. According to one embodiment, the reorganization planner 105 determines which objects are available for a particular tablespace by reading this information from the definition information 130. The calculation process 215 continues with process BLOCK 310, where the reorganization planner 105 calculates variables for the tablespace and available objects. For example, the reorganization planner 105 may advantageously calculate the amount of wasted space, or wasted data blocks (WB) for the tablespace, and the reorganization need (N) for each available object. According to one embodiment, the WB includes a measurement of that space, allocated under the HWM, but not currently needed to store the data. The WB can be quantified according to Equation 1.

$$WB = \text{MAX}\left(0, \text{FLOOR}\left(\frac{HWM - \dfrac{DS}{\left(1 - \dfrac{PF}{100}\right) * \text{MAX}\left(0.5, 1 - \dfrac{2*RL}{BS*\left(1 - \dfrac{PF}{100}\right)}\right)}}{BS}\right) - 1\right)$$ EQUATION 1

In Equation 1, the MAX function sets the result to the first parameter passed thereto, when that parameter is greater than the result of the second parameter. For example, the leftmost MAX function sets the result to zero when the FLOOR function minus one returns a result less than zero, whereas the rightmost MAX function sets the result to 0.5 when the parameter passed thereto returns a result less than 0.5. The FLOOR function truncates the value of the variables passed to it to an integer. As disclosed in the foregoing, the high water mark (HWM), the data size (DS), the percent free (PF), the row length (RL), and the block size (BS) are available to the reorganization planner 105 through the system table 125. As disclosed in the foregoing, the HWM includes the greatest amount of data allocated to the data blocks of an object. The DS includes the current size of actual data in the object, while the PF includes how much free space is left in a data block for future growth. The RL includes a measurement of the average row length. The BS includes the number of bytes per data block.

The term MAX (0.5, 1-((2*RL)\((BS)*(1-PF/100)))) advantageously limits the type of space that will be interpreted as wasted. For example, when a record, upon insertion, does not fit completely within the available space in a data block being used, the entire record will be placed in the next data block. This means that tables with larger rows will tend to have more left over space at the end of each block. Based on the foregoing, the present term provides that the foregoing space will not be interpreted as wasted in the result of the FLOOR function.

The term DS/(1-(PF/100)) represents the number of bytes of data currently residing in the object. Thus, the difference between the HWM and the combination of numerator terms, represents the amount of wasted space in the object, in bytes. By dividing that amount by the BS, the argument passed to the FLOOR function advantageously represents the amount of wasted space, in an object, in data blocks. According to this embodiment, the DBMS 110 often pre-allocates the next block to be used by an object, before the data block is needed. For this reason, (1) is subtracted from the calculated number of wasted blocks in Equation 1.

As discussed in the foregoing, the reorganization planner 105 at process BLOCK 310 also calculates the reorganization need (N) for each object. According to one embodiment, N accounts for wasted space, chained rows, and extents in the objects. For example, N may advantageously be quantified according to Equation 2.

$$N = (WB * W_{WB}) + CR + EC^2 - 1$$ EQUATION 2

In Equation 2, $W_{WB}$ is a weighting factor for the wasted blocks. For example, a system administrator may find that the reorganization need (N) calculation on a particular reorganization planning system 100 is being dominated by the wasted space calculation. On the other hand, the system administrator may find the wasted space calculation is not having enough influence on the resulting reorganization plan. Therefore, according to one embodiment, the system administrator may advantageously set $W_{WB}$ to range from zero to one hundred. According to a preferred embodiment, $W_{WB}$ may be set to range from one to one hundred, and, according to a more preferred embodiment, $W_{WB}$ may be set to ten.

As disclosed in the foregoing, the chained rows (CR) and extent count (EC) are available from the system table 125 and since all objects have at least one extent, (1) is subtracted from the $EC^2$.

Once the variables for the tablespace and available objects are calculated, the calculation process 215 continues to process BLOCK 315, where the reorganization planner 105 calculates a representation of the contiguous free space found in the tablespace (TFS). According to one embodiment, the TFS is an indication the concentration of the free space of the tablespace. Generally, the higher the concentration of free space, the more likely there are contiguous data block that the reorganization planner 105 can use for in-place reorganization, or recreation, of the objects of the tablespace. In-place reorganization is disclosed in further detail below with reference to FIG. 4. According to one embodiment, the reorganization planner 105 employs a tablespace map for determining the contiguous data blocks of free space. According to this embodiment, the tablespace map includes a mapping of data blocks containing data for the various objects of the tablespace. Using the tablespace map, the TFS may advantageously be quantified according to Equation 3.

$$TFS = \sqrt{\Sigma_N FS_N^2}$$ EQUATION 3

In Equation 3, the number of contiguous free space data blocks (FS) for each equation is squared, then summed. The square root of the sum of the squares of the number of contiguous free space blocks provides a metric for measuring the concentration of free space in the tablespace.

After determining free space concentration, the calculation process 215 continues to process BLOCK 320, where the reorganization planner 105 selects one of the available objects, and at process BLOCK 325, generates an object reorganization plan and potential tablespace map for the selected object. According to one embodiment, the object reorganization plan attempts to recreate the object within the existing tablespace, and then populate the object with its data. This process is hereinafter referred to as in-place reorganization. In-place reorganization costs half as much as copying the object to the scratchpad area, recreating the object within the tablespace, and moving the data back into the newly created object. As mentioned in the foregoing, use of the scratchpad area causes a move to the scratchpad area, and a move back. In-place reorganization needs at most only one move, for example, from the object to the newly created object within the contiguous free space of the tablespace.

After creating the object reorganization plan, the reorganization planner 105 simulates the reorganization in the tablespace map, thereby generating a potential tablespace map, showing the steps for reorganizing the object. According to one embodiment, the steps may include movement of one or more objects.

The reorganization planner 105, at process BLOCK 330, may advantageously calculate the benefit-cost ratio from the potential tablespace map. The object benefit is calculated as the sum of the reorganization need (N) for each object reorganized in the object reorganization plan. This sum is then added to the potential contiguous free space (PFS) and subtracted from the TFS. The N for each object was calculated during process BLOCK 310, and the TFS was calculated at process BLOCK 315. The PFS is calculated by applying Equation 3 to the potential tablespace map, thereby gaining a metric for the concentration of free space after implementing the object reorganization plan.

The cost associated with the object reorganization plan includes the number of data blocks that will be moved, if the reorganization planner 105 implements the current object reorganization plan. According to one embodiment, the cost of in-place reorganization of an object is the size, in data blocks, of the object, while the cost of the reorganization of an object by copying it to the scratchpad area is twice the size, in data blocks, of the object. Thus, for each object moved in the object reorganization plan, the associated cost of that move is summed to create a total object cost for the object reorganization plan. The object benefit is then divided by the total object cost, resulting in the benefit-cost ratio corresponding to the object reorganization plan associated with the current available object.

At process BLOCK 335, the reorganization planner 105 determines whether additional available objects have not had their benefit-cost ratio calculated. When an additional object meeting the foregoing criteria, the calculation process 215 returns to process BLOCK 320 and selects that object. When all of the available objects have been associated with an object reorganization plan and a benefit-cost ratio, the calculation process 215, at process BLOCK 340 selects the object reorganization plan associated with the best benefit-cost ratio. According to one embodiment, the best benefit-cost ratio is the largest benefit-cost ratio. According to other embodiments, additional criteria may be included in determining the best benefit-cost ratio, such as, for example, the frequency of reorganization of an object, the value of the object benefit, or the like.

The calculation process 215 then proceeds to process BLOCK 345 where the selected object is designated as unavailable. The designation indicates that the reorganization application 105 will use the object reorganization plan corresponding to the selected object, as the next step in the reorganization plan for the entire tablespace. Moreover, the potential tablespace map for the selected object becomes the new tablespace map to be used for developing subsequent steps in the reorganization plan for the entire tablespace.

The calculation process 215 then checks, at process BLOCK 350, whether additional available objects are present in the tablespace. When additional objects are available, the calculation process 215 returns to process BLOCK 315, and using the potential tablespace map from the previous selected object, the reorganization planner 105 computes a new TFS. According to this embodiment, because the selected object is removed from availability, the next pass through the iterative loop will not allow the selected object to be reorganized.

When, at process BLOCK 350, no additional objects are available, the calculation process 215 proceeds to BLOCK 355. At this point, the iterative nature of the calculation process 215 has developed one or more steps in the reorganization plan for the tablespace. Each step represents the reorganization of objects in descending benefit-cost ratio order. For example, as disclosed in the foregoing, the first step reorganizes at least the object having the best benefit-cost ratio, while the last step includes reorganization of an object having a lesser benefit-cost ratio.

At process BLOCK 355, the reorganization planner 105 applies the benefit threshold. According to one embodiment, the benefit threshold provides a marker, below which, the reorganization plan will not recommend the objects be included in reorganization of the tablespace. For example, the reorganization planner 105 may advantageously determine a benefit threshold value, where reorganization of objects beyond that threshold is too costly, inefficient, or burdensome. According to one embodiment, the reorganization planner 105 determines where to place the marker in the reorganization plan, as follows. The reorganization planner 105 already has the sum of the object benefits derived from following the reorganization plan, from, for example, the calculations disclosed in the foregoing. In addition, the reorganization plan includes reorganization steps having the objects ordered according to, for example, a descending benefit-cost ratio. Therefore, the reorganization planner 105 may advantageously traverse the order, tracking the sum of the acquired object benefits for each object traversed. Once the reorganization planner 105 has acquired object benefits exceeding the benefit threshold, the reorganization planner 105 advantageously places a marker before the next object. According to one embodiment, the marker designates that objects found thereafter in the reorganization plan should not be included in the reorganization of the tablespace.

According to one embodiment, the benefit threshold ranges from fifty to one hundred percent of the total object benefits derived from reorganization. According to a preferred embodiment, the benefit threshold ranges from seventy to ninety percent, and according to a most preferred embodiment, the benefit threshold is approximately eighty percent. According to some software systems, reorganization of the objects representing eighty percent of the potential object benefits available, costs less than twenty percent of the potential cost of reorganization. Often, such reorganization costs substantially less than twenty percent of the potential cost of reorganization.

Although the calculation process 215 is disclosed with reference to various embodiments, the invention is not intended to be limited thereby. Rather, a skilled artisan will recognize from the disclosure herein a wide number of alternatives for applying a benefit and cost based analysis on the objects to be reorganized. For example, several of the forgoing metrics or variable may be adjusted to reflect and potentially accentuate differing characteristics of the objects. For example, while the number of extents is an efficient and fast way of developing an indication of the reorganization need (N) of an object, it is not a perfect indicator. For example, according to the foregoing Equation 2, objects are penalized for having multiple extents. However, as long as the multiple extents are substantially the same size, and there is not an excessive number, the number of extents is not necessarily detrimental to performance. Therefore, an indicator of the variance of extent sizes may advantageously be employed to better evaluate the need for reorganizing a particular object. According to one embodiment, the reorganization need (N), may advantageously be quantified according to Equations 4 and 5.

$$EV = \frac{\sum_N (OA - E_N)^2}{(EC-1)*\left(\frac{OA}{EC} - BS\right)^2} \qquad \text{EQUATION 4}$$

$$N = (WB*W_{WB}) + CR + EV*\left(\frac{OA}{BS}\right)*W_{EV} \qquad \text{EQUATION 5}$$

Equation 4 develops an extent variance factor (EV). The higher the value of the EV, the more variance occurs between the average extent size and the smallest and largest extent sizes. The value $(OA-E_N)^2$ sums the variance in the extent sizes, while the numerator normalizes the summed variances to range from 0 to 1, inclusive. Equation 5 substitutes the square of the extent count ($EC^2-1$), with the EV multiplied by the data block size of the average extent size, multiplied by the extent variance weighting factor $W_{EV}$. Similar to the wasted block weighting factor, $W_{EV}$ allows a system administrator to vary the influence of the extent variance depending upon, for example, specific hardware/software configurations, accessibility considerations, or the like. Therefore, according to one embodiment, the system administrator may advantageously set $W_{EV}$ to range from zero to ten. According to a preferred embodiment, $W_{EV}$ may be set to range from one to ten, and, according to a more preferred embodiment, $W_{EV}$ may be set to one.

Based on the foregoing, the reorganization planner 105 advantageously develops a reorganization plan for the tablespace by iteratively developing object reorganization plans, and selecting the object reorganization plan that provides the best benefit-cost ratio. In addition, the reorganization planner includes a marker indicating which objects meet the benefit threshold, thereby providing the system administrator with the ability to remove or add objects to the reorganization plan. Thus, the system administrator may advantageously adjust the benefit received and the cost used, by the present reorganization plan.

Figure 4:
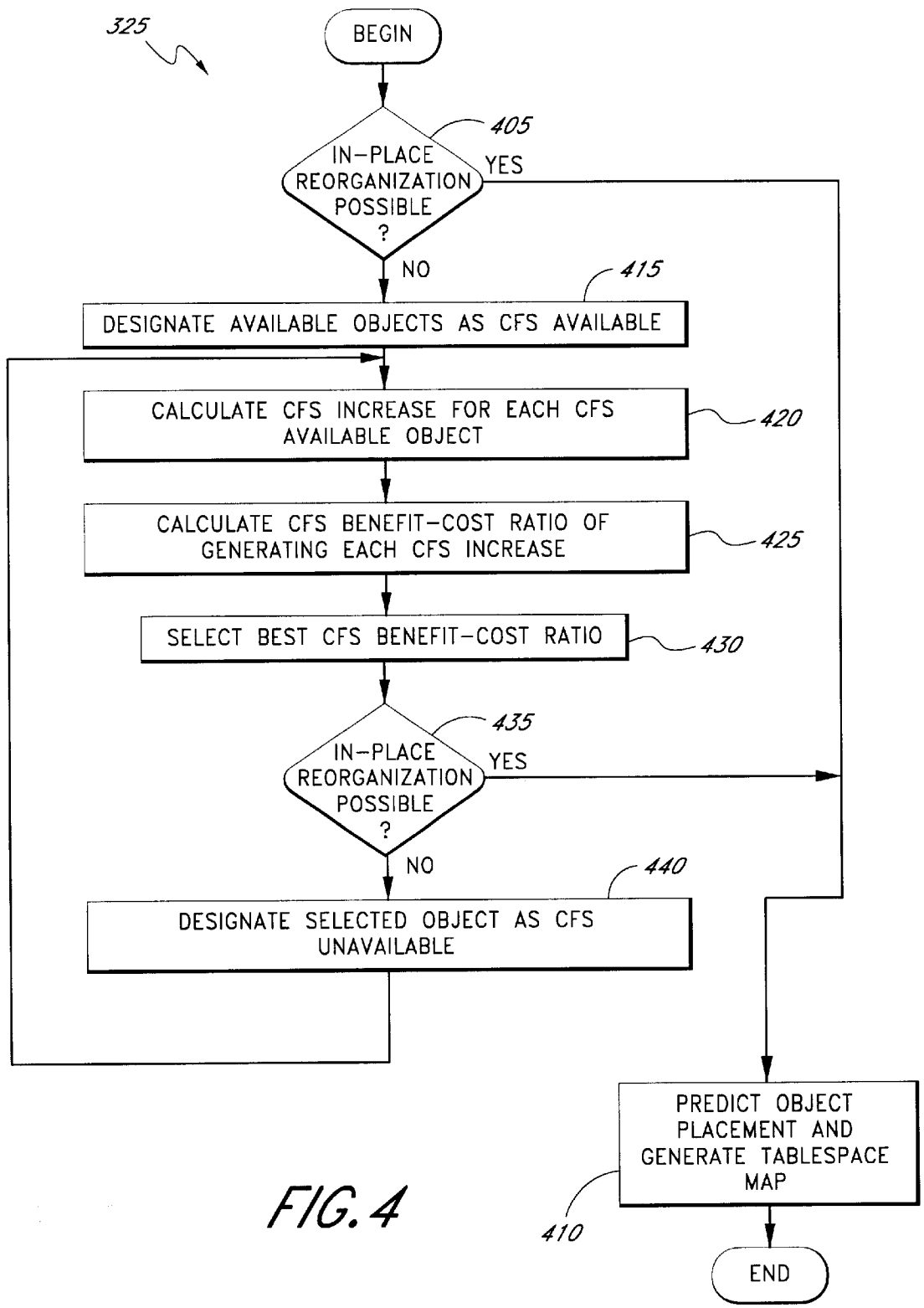
FIG. 4 illustrates a flowchart of an in-place reorganization process, according to aspects of another embodiment of the invention.

FIG. 4 illustrates a flowchart of an in-place reorganization process 325, according to aspects of another embodiment of the invention. As mentioned in the foregoing, in-place reorganization reduces the cost of reorganizing an object roughly in half. Therefore, at least one goal of the in-place reorganization process 325 is to find or create enough contiguous free space in the tablespace to recreate the current object from the calculation process 215, thereby developing an object reorganization plan that reorganizes the current object in-place.

The in-place reorganization process 325 begins with process BLOCK 405 where the reorganization planner 105 determines whether in-place reorganization of the current object is possible. According to one embodiment, the reorganization planner 105 searches the tablespace map to determine whether sufficient contiguous blocks of free space exists for recreating the current object. When it does, the in-place reorganization process 325 proceeds to process BLOCK 410, where the reorganization planner 105 predicts where objects will be placed and generates the potential tablespace map.

According to one embodiment, prediction of where objects will be placed corresponds to internal rules of the particular DBMS 110. For example, DBMS systems developed by Oracle Corporation generally follow rules pertaining to the creation of new extents, as described in Leverenz, Rehfield, "ORACLE 8I CONCEPTS, VOLUME 1, RELEASE 8.1.5," Oracle Corporation, 1999, Chapter 4, pages 11–14, incorporated by reference herein. In general, the rules provide that when contiguous free blocks, whose number matches the number of data blocks needed for a new extent, the new extent is created at that location. When the exact match cannot be found, but contiguous free blocks whose number is at least one but not more than five blocks more than the number of data blocks needed, then the new extent is created, using all of the contiguous free space blocks. When no group of contiguous free space blocks exist which has at least the number of blocks needed, but not more than five more than the number of blocks needed, then the new extent is created in that location using the number of blocks needed (starting at the beginning of the contiguous free space blocks). The free space blocks beyond the number needed remain free space.

Thus, the in-place reorganization process 325 predicts where the new extent in the tablespace will be allocated. The new extent advantageously corresponds to the recreation of the current object, thereby providing the cost-effective in-place reorganization of that object.

When in-place reorganization is not possible at process BLOCK 405, the in-place reorganization process 325 proceeds to process BLOCK 415 and designates all available objects as contiguous free space (CFS) available. At process BLOCK 420, the reorganization planner 105 calculates the contiguous free space increase (CFS increase) for each CFS available object. According to one embodiment, the CFS increase for each object corresponds to the contiguous free space that would be available to the tablespace, if that object were copied to the scratchpad area in order to make enough contiguous free space for in-place reorganization of the current object. Then, the current CFS of the object is subtracted from that number, thereby providing the amount of increase in contiguous free space from the current tablespace map.

At process BLOCK 425, the reorganization planner 105 calculates a CFS benefit-cost ratio, providing a metric of the benefits and costs associated with generating each CFS increase. According to one embodiment, the CFS benefit corresponds to the CFS increase, while the CFS cost corresponds to twice the size, in data blocks, of the object to be moved to the scratchpad area. The ratio of these values is computed, and at process BLOCK 430, the object having the best CFS benefit-cost ratio is selected. According to one embodiment, the best CFS benefit-cost ratio corresponds to the greatest value of the ratio.

At process BLOCK 425, the reorganization planner 105 determines whether removing the selected object generates sufficient contiguous free space to make in-place reorganization of the current object possible. When it does, the in-place reorganization process 325 proceeds to process BLOCK 410 and predicts object placement and generates the potential tablespace map. Included in the object placement are the steps of moving the selected object to the scratchpad area, and recreating that object in the tablespace. As mentioned in the foregoing, the recreation of the selected object reorganizes that object. Therefore, if the reorganization planner 105 chooses the current object as the best benefit-cost ratio according to the process BLOCK 340 of FIG. 3, the current object and the selected object will be designated as unavailable at process BLOCK 345 of FIG. 3.

When in-place reorganization is still not possible at process BLOCK 425 of FIG. 4, the in-place reorganization process 325 proceeds to process BLOCK 430. At process BLOCK 430, the in-place reorganization process 325 designates the selected object as CFS unavailable and returns to BLOCK 420 to recalculate the CFS increase for the CFS available objects. Thus, the in-place reorganization process 325 advantageously and iteratively plans steps which move objects from the tablespace to the scratchpad area until sufficient contiguous free space is available to reorganize the current object in-place.

According to one embodiment, when the reorganization planner 105 performs the in-place reorganization process 325 and does not generate sufficient contiguous free space to reorganize the current object, then the reorganization planner 105 includes a plan to move the current object to the scratchpad area, and then back into the contiguous free space created thereby.

FIG. 5 illustrates a simplified diagram of an exemplary tablespace map, according to aspects of yet another embodiment of the invention, while FIGS. 6–12 illustrate simplified diagrams of exemplary potential tablespace maps. As shown in FIG. 5, a tablespace map 500 may depict the fragmentation of a tablespace having four tables; Table T1, Table T2, Table T3, and Table T4, and three indexes; Index I1, Index I2, and Index I4. In addition, FIG. 5 shows various blocks of contiguous free space distributed, or fragmented, throughout the tablespace. According to the foregoing reorganization plan development process 200, the reorganization planner 105 gathers data on the objects of the tablespace and generates a reorganization plan. For example, the reorganization planner 105 may advantageously obtain the objects, their respective blocks, the amount of chained rows (CR) and the extent counts (EC) from the system table 125 of the database 115. In addition, the reorganization planner 105 may advantageously determine the wasted blocks (WB) and reorganization need (N) from, for example, Equations 1 and 2, thereby obtaining and calculating the information found in TABLE 1.

TABLE 1

| OBJECT | DESCRIPTION | BLOCKS | CR | EC | WB | N |
|---|---|---|---|---|---|---|
| T1 | TABLE | 3 | 10 | 1 | 0 | 10 |
| T2 | TABLE | 5 | 15 | 1 | 2 | 35 |
| T3 | TABLE | 3 | 0 | 3 | 1 | 18 |
| T4 | TABLE | 2 | 5 | 1 | 0 | 5 |
| I1 | INDEX | 2 |  | 1 | 1 | 10 |
| I2 | INDEX | 2 |  | 1 | 0 | 0 |
| I4 | INDEX | 1 |  | 1 | 0 | 0 |

According to the foregoing benefit-cost calculation process 215, the reorganization planner 105 designates the objects of TABLE 1 as available and uses the tablespace map 500 to calculate the contiguous free space found in the tablespace (TFS) according to Equation 3. For example, the TFS for the present tablespace is equal to $SQRT(2^2+3^2+1^2+1^2+3^2+2^2)$, or approximately 5.29. Thereafter, as disclosed foregoing, the calculation process 215 begins iteratively determining the object reorganization plan, the associated potential tablespace map, and the benefit-cost ratio, for each of the objects of TABLE 1.

Object Reorganization Plan for Table T1 and Corresponding Calculations

According to the calculation process 215, the object reorganization plan for Table T1 includes (1) dropping Index I1, as is depends on Table T1, (2) in-place reorganization of Table T1, and (3) recreation of Index I1. Following the prediction rules disclosed in the forgoing, the reorganization planner 105 determines that the object reorganization plan for Table T1 will produce a potential tablespace map 600 shown in FIG. 6. For example, after dropping Index I1, blocks 4–10 become contiguous free space. The reorganization planner 105 predicts that Table T1 will be placed the contiguous free space extent of blocks 21–23 by the DBMS 110, because the free space extent is large enough to hold Table T1. The reorganization planner 105 also predicts that Index I1 will be recreated in blocks 29–30 because the size of the contiguous free space is and exact match for the size of Index I1.

The reorganization planner 105 then uses the map 600 to determine the object benefit and the object cost for Table T1. As disclosed in the foregoing, the object benefit is calculated as the sum of the reorganization need (N) for each object reorganized in the object reorganization plan. This sum is then added to the potential contiguous free space (PFS) and subtracted from the TFS. Thus, the object benefit for Table T1 equals:

$$N(\text{Table } T1)+N(\text{Index } I1)+\text{PFS}-\text{TFS}.$$

Moreover, according to the map 600, the PFS for Table T1 equals:

$$SQRT(10^2+1^2+1^2)=10.10$$

Thus, the object benefit for Table T1 equals:

$$10+10+10.10-5.29=24.81.$$

The reorganization planner 105 then determines the object cost for Table T1. As disclosed in the foregoing, the object cost equals the number of moves for each object in the object reorganization plan. According to one embodiment, in-place reorganization of an object costs the size of the object (in blocks). When objects are moved to the scratchpad area, and then moved back, the cost is twice the size of the object (in blocks). According to one embodiment, because the action of dropping an index does not incur a significant processing costs, the cost of dropping an index and then recreating it, is the size of the index (in blocks). Accordingly, because Table T1 is reorganized in-place and is 3 blocks in size, object cost is 3. Also, because Index I1 is recreated and is 2 blocks in size, the object cost is 2. Therefore, the object cost for Table T1 equals:

$$3+2=5.$$

Accordingly, the benefit-cost ratio for Table T1 is:

$$24.81/5=4.96$$

Object Reorganization Plan for Table T2 and Corresponding Calculations

As shown in the tablespace map 500, Table 2 comprises 5 blocks, and is therefore bigger than any current set of contiguous free space. Thus, according to the development process 215, the reorganization planner 105 employs the in-place reorganization process 325 to attempt to create sufficient contiguous free space for Table 2 to be reorganized in-place. Accordingly, the reorganization planner 105 calculates the CFS benefit-cost ratio for the other available objects in the tablespace. As disclosed in the foregoing, the CFS benefit-cost ratio is the ratio of the CFS increase, divided by the CFS cost. The CFS increase comprises the largest amount of contiguous free space in the tablespace if the object were moved from the tablespace to the scratchpad area, minus the current amount of contiguous free space. The CFS cost comprises the cost of performing a temporary move. According to one embodiment the CFS cost, for tables, is twice the size of the table (in blocks), because the table is moved to the scratchpad area, then moved back. The CFS cost, for indexes, is the size of the index (in blocks), because the action of dropping an index does not incur significant processing costs. Moreover, the index can be recreated in-place later in the reorganization.

Thus, as shown in FIG. 5, the largest amount of contiguous free space before any move is three blocks. Moreover, the results of moving various objects from the tablespace, provides the benefit-costs results as illustrated in TABLE 2.

TABLE 2

| OBJECT | CFS | CFS INCREASE | CFS COST | BENEFIT-COST RATIO |
|---|---|---|---|---|
| T1 | 5 | 2 | 6 | 0.333 |
| T3 | 8 | 5 | 6 | 0.833 |
| T4 | 3 | 0 | 4 | 0 |
| I1 | 7 | 4 | 2 | 2 |
| I2 | 5 | 2 | 2 | 1 |
| I4 | 3 | 0 | 1 | 0 |

As shown in TABLE 2, dropping Index I1 provides the greatest CFS benefit-cost ratio and provides seven blocks of contiguous free space. Because Table T2 needs only five contiguous blocks, the present iteration of the in-place reorganization process 325 is sufficient to create the free space for the in-place reorganization of Table 2. However, as disclosed in the foregoing, had the dropping of Index I1 not provided enough contiguous free space, the in-place reorganization process 325 would advantageously recompute the foregoing CFS calculations against a tablespace map having Index I1 removed, thereby iteratively seeking sufficient contiguous free space.

Therefore, the calculation process 215 determines that the object reorganization plan for Table T2 includes (1) dropping Index I1, (2) in-place reorganization of Table T2, and (3) recreation of Index I1. Following the prediction rules disclosed in the forgoing, the reorganization planner 105 determines that the object reorganization plan for Table T2 will produce a potential tablespace map 700, as shown in FIG. 7. For example, after dropping Index I1, blocks 4–10 become contiguous free space. The reorganization planner 105 predicts that Table T2 will be placed in this contiguous free space extent, because the free space extent is large enough to hold Table T2. The reorganization planner 105 also predicts that Index I1 will be recreated in blocks 29–30 because the size of the contiguous free space is and exact match for the size of Index I1.

The reorganization planner 105 then uses the map 700 to determine the object benefit and the object cost for Table T2. The object benefit for Table T2 equals:

$N$(Table $T2$)+$N$(Index $I1$)+PFS−TFS.

Moreover, according to the map 700, the PFS for Table T2 equals:

SQRT($7^2+1^2+1^2+3^2$)=7.75.

Thus, the object benefit for Table T2 equals:

35+10+7.75−5.29=47.46

The reorganization planner 105 then determines the object cost for Table T2. Because Table T2 is reorganized in-place and is 5 blocks in size, object cost is 5. Also, because Index I1 is recreated and is 2 blocks in size, the object cost is 2. Therefore, the object cost for Table T2 equals:

3+2=7.

Accordingly, the benefit-cost ratio for Table T2 is:

47.46/7=6.78

Object Reorganization Plan for Table T3 and Corresponding Calculations

According to the calculation process 215, the object reorganization plan for Table T3 includes (1) dropping Index I3, as is depends on Table T3, (2) in-place reorganization of Table T3, and (3) recreation of Index I3. Following the prediction rules disclosed in the forgoing, the reorganization planner 105 determines that the object reorganization plan for Table T3 will produce a potential tablespace map 800, as shown in FIG. 8.

The reorganization planner 105 then uses the map 800 to determine the object benefit and the object cost for Table T3. The object benefit for Table T3 equals:

$N$(Table $T3$)+$N$(Index $I3$)+PFS−TFS.

Moreover, according to the map 800, the PFS for Table T3 equals:

SQRT($10^2+2^2$)=10.20

Thus, the object benefit for Table T3 equals:

18+0+10.20−5.29=22.91.

The reorganization planner 105 then determines the object cost for Table T3. Because Table T3 is reorganized in-place and is 3 blocks in size, object cost is 3. Also, because Index I3 is recreated and is 2 blocks in size, the object cost is 2. Therefore, the object cost for Table T3 equals:

3+2=5.

Accordingly, the benefit-cost ratio for Table T3 is:

22.91/5=4.58

Object Reorganization Plan for Table T4 and Corresponding Calculations

According to the calculation process 215, the object reorganization plan for Table T4 includes (1) dropping Index I4, as is depends on Table T4, (2) in-place reorganization of Table T4, and (3) recreation of Index I4. Following the prediction rules disclosed in the forgoing, the reorganization planner 105 determines that the object reorganization plan for Table T4 will produce a potential tablespace map 900, as shown in FIG. 9.

The reorganization planner 105 uses the map 900 to determine the object benefit and the object cost for Table T4. The object benefit for Table T4 equals:

$N$(Table $T4$)+$N$(Index $I4$)+PFS−TFS.

Moreover, according to the map 900, the PFS for Table T4 equals:

SQRT($3^2+1^2+3^2+5^2$)=6.63.

Thus, the object benefit for Table T3 equals:

5+0+6.63−5.29=6.34

The reorganization planner 105 then determines the object cost for Table T4. Because Table T4 is reorganized in-place and is 2 blocks in size, object cost is 2. Also, because Index I4 is recreated and is 1 Block in size, the object cost is 1.

Therefore, the object cost for Table T4 equals:

2+1=3.

Accordingly, the benefit-cost ratio for Table T4 is:

6.34/3=2.11

Object Reorganization Plan for Index I1 and Corresponding Calculations

According to the calculation process 215, the object reorganization plan for Index I1 includes (1) dropping Index I1, (2) recreation of Index I1. Following the prediction rules disclosed in the forgoing, the reorganization planner 105 determines that the object reorganization plan for Index I1 will produce a potential tablespace map 1000, as shown in FIG. 10.

The reorganization planner 105 then uses the map 1000 to determine the object benefit and the object cost for Index I1. The object benefit for Index I1 equals:

$N$(Index $I1$)+PFS−TFS.

Moreover, according to the map 1000, the PFS for Index I1 equals:

SQRT($7^2+1^2+1^2+3^2$)=7.75.

Thus, the object benefit for Index I1 equals:

10+7.75−5.29=12.46

The reorganization planner 105 then determines the object cost for Index I1. Because Index I1 is reorganized in-place and is 2 blocks in size, object cost is 2. Therefore, the object cost for Index I1 equals 2, and the benefit-cost ratio for Index 11 is:

12.46/2=6.23

Object Reorganization Plan for Index I3 and Corresponding Calculations

According to the calculation process 215, the object reorganization plan for Index I3 includes (1) dropping Index I3, (2) recreation of Index I3. Following the prediction rules disclosed in the forgoing, the reorganization planner 105 determines that the object reorganization plan for Index I3 will produce a potential tablespace map 1100, as shown in FIG. 11.

The reorganization planner 105 then uses the map 1100 to determine the object benefit and the object cost for Index I1. The object benefit for Index I1 equals:

$N$(Index $I3$)+PFS−TFS.

Moreover, according to the map 1100, the PFS for Index I3 equals:

SQRT($3^2+1^2+5^2+2^2$)=6.32.

Thus, the object benefit for Index I3 equals:

0+6.32−5.29=1.03

The reorganization planner 105 then determines the object cost for Index I3. Because Index I3 is reorganized in-place and is 2 blocks in size, object cost is 2. Therefore, the object cost for Index I1 equals 2, and the benefit-cost ratio for Index I1 is:

1.03/2 32 0.52

Object Reorganization Plan for Index I4 and Corresponding Calculations

According to the calculation process 215, the object reorganization plan for Index I4 includes (1) dropping Index I4, (2) recreation of Index I4. Following the prediction rules disclosed in the forgoing, the reorganization planner 105 determines that the object reorganization plan for Index I4 will produce a potential tablespace map 1200, as shown in FIG. 12.

The reorganization planner 105 then uses the map 1200 to determine the object benefit and the object cost for Index I4. The object benefit for Index I4 equals:

$N$(Index $I4$)+PFS−TFS.

Moreover, according to the map 1200, the PFS for Index I4 equals:

SQRT($2^2+3^2+1^2+3^2+3^2$)=5.66.

Thus, the object benefit for Index I4 equals:

0+5.66−5.29=0.37

The reorganization planner 105 then determines the object cost for Index I4. Because Index I4 is reorganized in-place and is 1 Block in size, object cost is 1. Therefore, the object cost for Index I4 equals 1 and the benefit-cost ratio for Index I4 is:

0.37/1=0.37

Thus, according to the foregoing, the reorganization planner 105 employs the development process 215 to create object reorganization plans and their associated benefit-cost ratios for each available object in the tablespace, for example, T1, T2, T3, T4, I1, I3, and I4. The reorganization planner 105 then selects the object reorganization plan producing the best benefit-cost ratio. Based on the foregoing calculations, the greatest benefit-cost ratio corresponds to Table T2. As disclosed in the foregoing, the object reorganization plan for Table T2 includes (1) dropping Index I1, (2) in-place reorganization of Table T2, and (3) recreation of Index I1. Thus, according to one embodiment, Steps 1–3 are advantageously added to the reorganization plan for the tablespace. Thus, Table T2 is now designated as unavailable and Index I1 is dropped.

The reorganization planner 105 then uses the corresponding tablespace map 700 as the tablespace map to determine the next tablespace free space (TFS). Then, the reorganization planner 105 processes another iteration of generating object reorganization plans for the remaining available objects, chooses the best benefit-cost ratio, and proceeds to another iteration. The iterations are repeated until the available objects have been reorganized, or the objects no longer produce positive object benefits.

According to an embodiment of the invention, because the present iterative step includes dropping an index, Index I1, for reorganization, the calculation process 215 makes a minor adjustment. For example, indexes, when dropped, may advantageously be recreated at the end of the reorganization. Therefore, the reorganization planner 105 leaves the recreation of Index I1 out of the reorganization plan, until the plan is complete. Thus, although the calculation process 215 advantageously considers the recreation of the indexes when evaluating objects for reorganization such that free space organization is properly evaluated, the tablespace map 1000 sent to the next iteration does not have Index I1 therein. Based on the foregoing, the reorganization planner

105 advantageously leaves recreation of indexes out the reorganization plan, thereby avoiding the need to drop one of those indexes to create sufficient contiguous free space for in-place reorganization of another object.

According to another embodiment, tables are reorganized only once in a given reorganization plan. This means that once a table is reorganized, it is designated as unavailable for reorganization in future iterations. Therefore, once an object is reorganized, its position becomes fixed for the remainder of the iterative process.

As shown in FIG. 3, according to one embodiment, the reorganization planner 105 traverses any resulting reorganization plan and collects the object benefit gained with each reorganization step. When the object benefit reaches the benefit threshold, the reorganization planner 105 inserts a marker, thereby recommending that any remaining objects be left out of the final reorganization plan. As mentioned in the foregoing, according to one embodiment, the benefit threshold is approximately eighty percent of the sum of the object benefits associated with reorganizing every object in the reorganization plan.

Although the foregoing invention has been described in terms of certain preferred embodiments, other embodiments will be apparent to those of ordinary skill in the art from the disclosure herein. For example, the reorganization plan development process 200 may advantageously be applied to virtually any type of data stored in logical groups that can become fragmented. For example, a skilled artisan will recognize from the disclosure herein, the adaptability of the instant invention to reorganization of data stored on logical devices other than databases, accessed through systems other than DBMS, such as, for example, hard drives accessed through operating systems.

In addition, the skilled artisan will recognize from the disclosure herein that the application of the concepts of cost and benefits to the reorganization plan may advantageously comprise developing the plan based only on the costs of reorganization, only on benefits of reorganization, or many potential combinations of both.

According to an embodiment where the reorganization planning system 100 automatically selects the objects to reorganize, the reorganization planner 105 may advantageously be scheduled to run on a periodic basis, a performance basis, or a combination of both. In addition, according to yet another embodiment, the benefit-cost ratio is used to select objects to reorganize, but the reorganization planner 105 does not iteratively determine a reorganization plan to increase in-place reorganizations. According to such an embodiment, the reorganization planner 105 may advantageously reorganize in-place any objects that may be reorganized in such manner. Alternatively, the reorganization planner 105 may employ the scratchpad area rather than attempt in-place reorganization.

Additionally, other combinations, omissions, substitutions and modifications will be apparent to the skilled artisan in view of the disclosure herein. Accordingly, the present invention is not intended to be limited by the reaction of the preferred embodiments, but is to be defined by reference to the appended claims.

What is claimed is:

1. A method of developing a plan to reorganize a tablespace that increases the benefit derived from the reorganization while decreasing the cost associated with the reorganization, the method comprising:

determining an object benefit for each of multiple objects of a tablespace, each object benefit being based at least in Dart upon a free space distribution within the tablespace associated with the reorganization of one of the multiple objects, wherein the object benefit for each of the multiple objects comprises a measurement of the reorganization need associated with each object, wherein the reorganization need includes a measurement of wasted space, and wherein the measurement of wasted space includes a measurement of the actual data within each object that is calculated according to $$\frac{DS}{1 - \frac{PF}{100}};$$

determining an object cost for each of the multiple objects, each object cost being based at least in part upon the size of one of the multiple objects;

for each object, generating a benefit-cost indicator which accounts for the object benefit and the object cost associated with the reorganization of the object; and developing a plan for reorganizing the tablespace based on at least the benefit-cost indicator.

2. A method of developing a plan to reorganize a tablespace that increases the benefit derived from the reorganization while decreasing the cost associated with the reorganization, the method comprising:

determining an object benefit for each of multiple objects of a tablespace, each object benefit being based at least in part upon a free space distribution within the tablespace associated with the reorganization of one of the multiple objects, wherein the object benefit for each of the multiple objects comprises a measurement of the reorganization need associated with each object, wherein the reorganization need includes a measurement of wasted space that is calculated according to $$WB = \text{MAX}\left(0, \text{FLOOR}\left(\frac{HWM - \frac{DS}{\left(1 - \frac{PF}{100}\right) * \text{MAX}\left(0.5, 1 - \frac{2*RL}{BS*\left(1 - \frac{PF}{100}\right)}\right)}}{BS}\right) - 1\right);$$

determining an object cost for each of the multiple objects, each object cost being based at least in Dart upon the size of one of the multiple objects;

for each object, generating a benefit-cost indicator which accounts for the object benefit and the object cost associated with the reorganization of the object; and developing a plan for reorganizing the tablespace based on at least the benefit-cost indicator.

3. A method of developing a plan to reorganize a tablespace that increases the benefit derived from the reorganization while decreasing the cost associated with the reorganization, the method comprising:

determining an object benefit for each of multiple objects of a tablespace, each object benefit being based at least in part upon a free space distribution within the tablespace associated with the reorganization of one of the multiple objects, wherein the object benefit for each of the multiple objects comprises a measurement of the reorganization need associated with each object, wherein the reorganization need includes a measurement of extents that is calculated according to $$EV = \frac{\sum_N (OA - E_N)^2}{(EC-1) * \left(\frac{OA}{EC} - BS\right)^2};$$

determining an object cost for each of the multiple objects, each object cost being based at least in part upon the size of one of the multiple objects;

for each object, generating a benefit-cost indicator which accounts for the object benefit and the object cost associated with the reorganization of the object; and developing a plan for reorganizing the tablespace based on at least the benefit-cost indicator.

4. A method of developing a plan to reorganize a tablespace that increases the benefit derived from the reorganization while decreasing the cost associated with the reorganization, the method comprising:

determining an object benefit for each of multiple objects of a tablespace, each object benefit being based at least in part upon a free space distribution within the tablespace associated with the reorganization of one of the multiple objects, wherein the object benefit for each of the multiple objects comprises a measurement of the reorganization need associated with each object, and wherein the measurement of the reorganization need is calculated according to $$N = (WB * W_{WB}) + CR + EC^2 - 1;$$

determining an object cost for each of the multiple objects, each object cost being based at least in part upon the size of one of the multiple objects;

for each object, generating a benefit-cost indicator which accounts for the object benefit and the object cost associated with the reorganization of the object; and developing a plan for reorganizing the tablespace based on at least the benefit-cost indicator.

5. A method of developing a plan to reorganize a tablespace that increases the benefit derived from the reorganization while decreasing the cost associated with the reorganization, the method comprising:

determining an object benefit for each of multiple objects of a tablespace, each object benefit being based at least in part upon a free space distribution within the tablespace associated with the reorganization of one of the multiple objects, wherein the object benefit for each of the multiple objects comprises a measurement of the reorganization need associated with each object, and wherein the reorganization need is calculated according to $$N = (WB * W_{WB}) + CR + EV * \left(\frac{OA}{BS}\right) * W_{EV};$$

determining an object cost for each of the multiple objects, each object cost being based at least in Dart upon the size of one of the multiple objects;

for each object, generating a benefit-cost indicator which accounts for the object benefit and the object cost associated with the reorganization of the object; and developing a plan for reorganizing the tablespace based on at least the benefit-cost indicator.

6. A method of developing a plan to reorganize a tablespace that increases the benefit derived from the reorganization while decreasing the cost associated with the reorganization, the method comprising:

determining an object benefit for each of multiple objects of a tablespace, each object benefit being based at least in part upon a free space distribution within the tablespace associated with the reorganization of one of the multiple objects, wherein the object benefit for each of the multiple objects comprises a measurement of the contiguous free space found in the tablespace, wherein the measurement of the contiguous free space is calculated according to $$TFS = \sqrt{\sum_N FS_N^2};$$

determining an object cost for each of the multiple objects, each object cost being based at least in Dart upon the size of one of the multiple objects;

for each object, generating a benefit-cost indicator which accounts for the object benefit and the object cost associated with the reorganization of the object; and developing a plan for reorganizing the tablespace based on at least the benefit-cost indicator.

7. A method of developing a plan to reorganize a tablespace that increases the benefit derived from the reorganization while decreasing the cost associated with the reorganization, the method comprising:

determining an object benefit for each of multiple objects of a tablespace, each object benefit being associated with the reorganization of one of the multiple objects;

determining an object cost for each of the multiple objects, each object cost being associated with the reorganization of one of the multiple objects;

for each object, generating a benefit-cost indicator which accounts for object benefit and the object cost associated with the reorganization of the object; and developing a plan for reorganizing the tablespace based on at least the benefit-cost indicator, wherein the object benefit for each of the multiple objects comprises a measurement of the reorganization need associated with each object, wherein the reorganization need includes a measurement of wasted space, wherein the measurement of wasted space includes a measurement of the actual data within each object, and wherein the measurement of the actual data within each object is calculated according to $$\frac{DS}{1 - \frac{PF}{100}};$$

8. A method of developing a plan to reorganize a tablespace that increases the benefit derived from the reorganization while decreasing the cost associated with the reorganization, the method comprising:

determining an object benefit for each of multiple objects of a tablespace, each object benefit being associated with the reorganization of one of the multiple objects;

determining an object cost for each of the multiple objects, each object cost being associated with the reorganization of one of the multiple objects;

for each object, generating a benefit-cost indicator which accounts for object benefit and the object cost associated with the reorganization of the object; and developing a plan for reorganizing the tablespace based on at least the benefit-cost indicator, wherein the object benefit for each of the multiple objects comprises a measurement of the reorganization need associated with each object, wherein the reorganization need includes a measurement of wasted space, and wherein the measurement of wasted space is calculated according to $$WB = \text{MAX}\left[0, \text{FLOOR}\left(\frac{HWM - \frac{DS}{\left(1 - \frac{PF}{100}\right) * \text{MAX}\left(0.5, 1 - \frac{2*RL}{BS*\left(1 - \frac{PF}{100}\right)}\right)}}{BS}\right) - 1\right].$$

9. A method of developing a plan to reorganize a tablespace that increases the benefit derived from the reorganization while decreasing the cost associated with the reorganization, the method comprising:

determining an object benefit for each of multiple objects of a tablespace, each object benefit being associated with the reorganization of one of the multiple objects;

determining an object cost for each of the multiple objects, each object cost being associated with the reorganization of one of the multiple objects;

for each object, generating a benefit-cost indicator which accounts for object benefit and the object cost associated with the reorganization of the object; and developing a plan for reorganizing the tablespace based on at least the benefit-cost indicator, wherein the object benefit for each of the multiple objects comprises a measurement of the reorganization need associated with each object, wherein the reorganization need includes a measurement of extents, and wherein measurement of extents is calculated according to $$EV = \frac{\sum_N (OA - E_N)^2}{(EC - 1) * \left(\frac{OA}{EC} - BS\right)^2}.$$

10. A method of developing a plan to reorganize a tablespace that increases the benefit derived from the reorganization while decreasing the cost associated with the reorganization, the method comprising:

determining an object benefit for each of multiple objects of a tablespace, each object benefit being associated with the reorganization of one of the multiple objects;

determining an object cost for each of the multiple objects, each object cost being associated with the reorganization of one of the multiple objects;

for each object, generating a benefit-cost indicator which accounts for object benefit and the object cost associated with the reorganization of the object; and developing a plan for reorganizing the tablespace based on at least the benefit-cost indicator, wherein the object benefit for each of the multiple objects comprises a measurement of the reorganization need associated with each object and wherein the reorganization need is calculated according to $$N = (WB * W_{WB}) + CR + EC^2 - 1.$$

11. A method of developing a plan to reorganize a tablespace that increases the benefit derived from the reorganization while decreasing the cost associated with the reorganization, the method comprising:

determining an object benefit for each of multiple objects of a tablespace, each object benefit being associated with the reorganization of one of the multiple objects;

determining an object cost for each of the multiple objects, each object cost being associated with the reorganization of one of the multiple objects;

for each object, generating a benefit-cost indicator which accounts for object benefit and the object cost associated with the reorganization of the object; and developing a plan for reorganizing the tablespace based on at least the benefit-cost indicator, wherein the object benefit for each of the multiple objects comprises a measurement of the reorganization need associated with each object and wherein the reorganization need is calculated according to $$N = (WB * W_{WB}) + CR + EV * \left(\frac{OA}{BS}\right) * W_{EV}.$$

12. A method of developing a plan to reorganize a tablespace that increases the benefit derived from the reorganization while decreasing the cost associated with the reorganization, the method comprising:

determining an object benefit for each of multiple objects of a tablespace, each object benefit being associated with the reorganization of one of the multiple objects;

determining an object cost for each of the multiple objects, each object cost being associated with the reorganization of one of the multiple objects;

for each object, generating a benefit-cost indicator which accounts for object benefit and the object cost associated with the reorganization of the object; and developing a plan for reorganizing the tablespace based on at least the benefit-cost indicator, wherein the object benefit for each of the multiple objects comprises a measurement of the contiguous free space found in the tablespace and wherein the measurement of the contiguous free space is calculated according to $$TFS = \sqrt{\sum_N FS_N^2}.$$

* * * * *

UNITED STATES PATENT AND TRADEMARK OFFICE
CERTIFICATE OF CORRECTION

PATENT NO. : 6,834,290 B1
APPLICATION NO. : 09/712890
DATED : December 21, 2004
INVENTOR(S) : Thomas Pugh et al.

It is certified that error appears in the above-identified patent and that said Letters Patent is hereby corrected as shown below:

On Title Page Item (56)
On page 2, column 2, OTHER PUBLICATIONS, line 1 delete "Tsreorg" and insert therefore -- TSreorg --.

Title Page, Item (56)
On page 2, column 2, OTHER PUBLICATIONS, line 6-7 delete "space_manager_wp.doc" and insert therefore --space_managerwp.doc --.

At column 24, line 9, claim 1, delete "Dart" and insert therefore -- part --,.

At column 24, line 56, claim 2, delete "Dart" and insert therefore -- part --.

At column 25, line 66, claim 5, delete "Dart" and insert therefore -- part --.

At column 26, line 20-25 (formula), claim 6, delete " $TFS = \sqrt{\sum_N FS_{N2}}$ ; " and insert -- $TFS = \sqrt{\sum_N FS_N^2}$ ; --, therefore.

At column 26, line 26, claim 6, delete "Dart" and insert therefore -- part --.

At column 26, line 60 (formula), claim 7, after " $\dfrac{DS}{1 - \dfrac{PF}{100}}$ " delete ";" and insert therefore -- . --.

UNITED STATES PATENT AND TRADEMARK OFFICE
CERTIFICATE OF CORRECTION

PATENT NO.         : 6,834,290 B1
APPLICATION NO. : 09/712890
DATED              : December 21, 2004
INVENTOR(S)        : Thomas Pugh et al.

It is certified that error appears in the above-identified patent and that said Letters Patent is hereby corrected as shown below:

At column 19, line 66, delete "3+2=7" and insert therefore --5+2=7--.

Signed and Sealed this

Twenty-fourth Day of October, 2006

JON W. DUDAS
*Director of the United States Patent and Trademark Office*